Jan. 21, 1964 F. M. STUMPF 3,118,459
APPARATUS FOR WETTING DRY MATERIALS
Filed Aug. 20, 1962
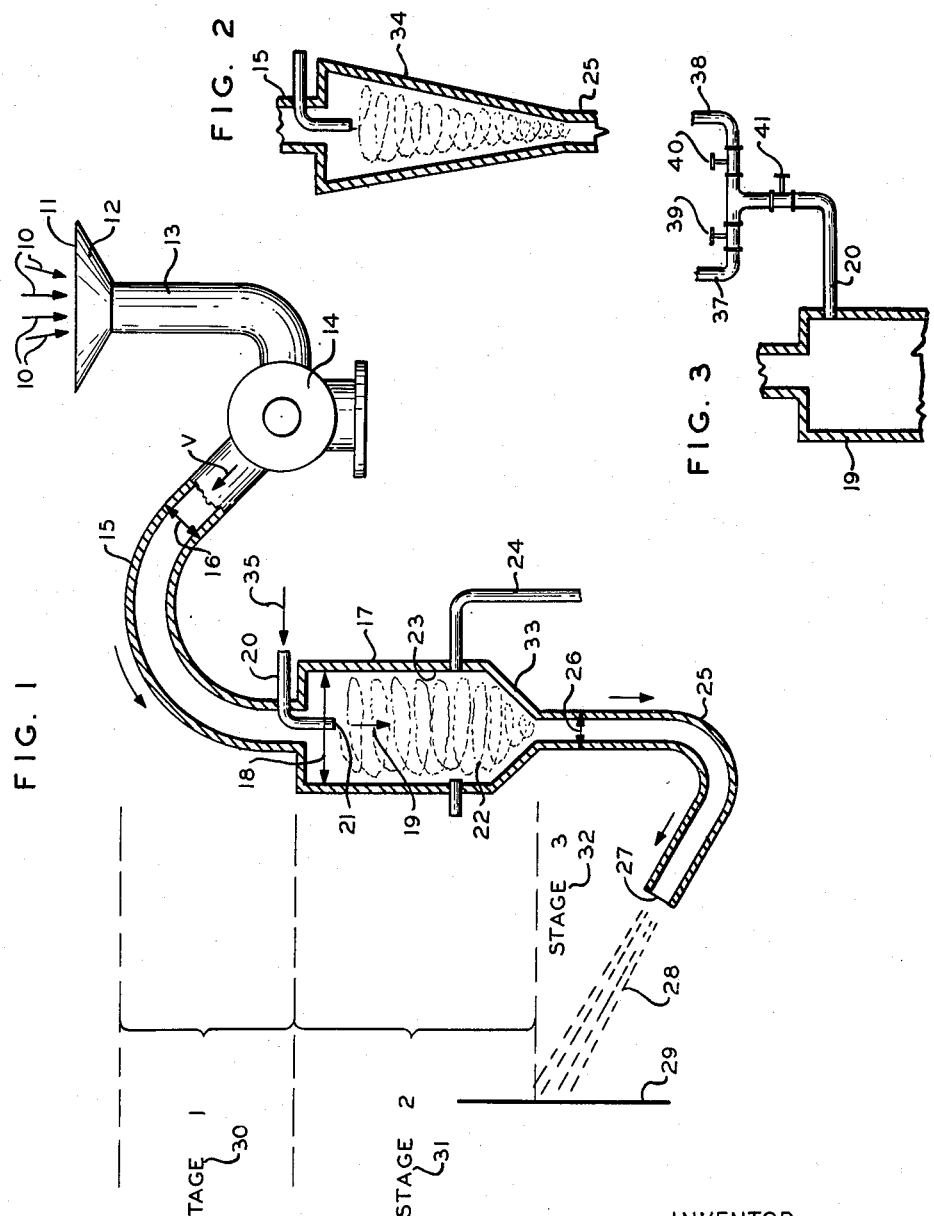
INVENTOR
FRANK M. STUMPF
BY *Harry Sommers*
ATTORNEY United States Patent Office 3,118,459
Patented Jan. 21, 1964

3,118,459
APPARATUS FOR WETTING DRY MATERIALS
Frank M. Stumpf, Morristown, N.J., assignor to United States Mineral Wool Company, Stanhope, N.J., a corporation of New Jersey
Filed Aug. 20, 1962, Ser. No. 217,982
2 Claims. (Cl. 134—155)

This invention relates to an apparatus for wetting dry particle materials, in passage through a conduit, for discharge from an open end thereof and onto a surface to be coated. As used herein the term "wet" shall mean the addition of liquids or semi-liquids to dry materials, for adding color and/or binders to the materials, to de-dust the dry materials, and to wet them for various purposes. The materials may be organic or inorganic fibers, granules or powders or combination thereof, which are ultimately applied as coatings for acoustical, fireproofing, thermal conductivity, condensation control, decorative or other purposes to various surfaces such as walls, ceilings and floors.

Pursuant to the invention, dry materials enter the first stage of a hose or other pneumatic conduit at a certain velocity which is fixed by the area of the inlet hose, and by the pressure of air used to convey the materials. The material is discharged pursuant to the invention into a second stage or zone of the conduit which is of a greater diameter, and thus the velocity is decreased and then into a third zone or stage of the conduit, which is of a third dimension, is smaller than the second stage and therefore the velocity of the material through said third zone is increased; the material is maintained at this velocity until it is discharged from the equipment. The material remains in the second stage, of larger area, at lower velocity, for a period much longer than in the first area. In the second zone, the material has time to become wet with the liquids, which may be applied by direct pressure, spray, atomized, air atomized, or atomized by other means or by gases, such as steam or carbon dioxide. It has been found that the material tends to whirl while in this low pressure area so that all areas thereof come intimately in contact with the liquid and are thoroughly wetted thereby. By this technique it is possible to introduce moisture in excess of 100% of the weight of the materials and still maintain these materials in a sufficiently dry state so that they may be pneumatically conveyed without adhering to the conveyor walls. This is an important consideration since the adherence of the material to the conveyor wall would soon cause the apparatus to clog, decreasing efficiency and requiring disassembly and frequent cleaning, and rendering the apparatus inoperative during that time.

Materials wet by this invention may thus achieve a moisture content far in excess of that possible by any other known technique of introducing moisture into materials being conveyed. The unit of the invention may be operated in any position, but, for most efficient purposes, the material is caused to flow downwardly and is helped by gravitational pull. The invention makes it possible to discharge materials which originally were completely dry, in a semi-wet or wet state, the materials thus being de-dusted and moistened sufficiently without causing them to stick, and it is further possible to intimately mix binders and colors without the need of mechanical agitation.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a side elevational, partly sectional view of an apparatus embodying the invention, FIG. 2 is a fragmentary sectional view of another form of second zone area thereof, and FIG. 3 is a fragmentary sectional view of another form of wetting means which may be used for the second zone area.

As shown in the drawings (FIG. 1) pursuant to the invention the dry material particles, above described and represented by the arrows 10 for simplicity of illustration, are dropped as at 11 into the hopper 12 and thence by a pipe 13 or the like to the inlet end of a pump 14, which will impart velocity (indicated by arrow V, FIG. 1) thereto and deliver same to a first zone or stage 15 which is the first of three distinct velocity change zones or stages. Said first zone is of a diameter 16 and volume such that the particles 10 will move through said zone under air pressure (pump 14) to impart a velocity of movement of said particles through said first zone 15 of a given ratio, speed, quantity or value. The materials pass from the said first zone 15 into a second zone 17 having a diameter 18 and volumetric capacity such that the materials will be pneumatically moved or conveyed through said second zone 17, at an appreciably lower velocity. The apparatus is preferably so disposed that the second zone 17 is disposed vertically and parallel to the line of gravitational pull 19; the material flows through said second zone at a much lower velocity than through the first zone 15 and, in its slower passage through said second zone, is wet by means such as schematically noted at 20, opening, as at 21, into said second zone. It is believed that the material particles whirl in said second zone 17 as indicated at 22. This whirling movement of the materials at the slower rate through the second zone 17 assures a complete wetting of the materials so that, as above noted, it is possible to introduce moisture in excess of 100% by weight of the materials and still maintain the materials in a sufficiently dry state pneumatically conveyed that they will not adhere to the interior of wall 23 or tapered lower end 33 of the second zone portion 17. The second zone 17 may be disposed in said perpendicular position by means of a bracket 24 secured to a ground or other support at its opposite end (not shown). The apparatus terminates in a third, discharge zone 25, which may be a hose or the like having a diameter 26 and volume such that the material will then flow through said third zone 25 at a higher velocity and be discharged from the open end thereof 27, as indicated, as a stream 28 of so wetted particles and may be manually or mechanically directed onto the surface 29 to be coated thereby.

The apparatus thus comprises, as above noted, three stages; stage 1 (so marked at 30 in FIG. 1) is a high velocity stage, stage 2, the wetting stage at which the velocity is substantially decreased, marked 31, and the third velocity stage marked 32, which is again a high velocity stage for discharge of the so wetted particles onto the surface 29 to be coated. The second and third zone portions of the apparatus 17 and 25 respectively, may be connected by tapered portion 33, which may comprise the lowermost end or section of the second zone as shown in FIG. 1, or the second zone may be continually tapered as indicated at 34 in FIG. 2 toward the third zone. The wetting means 20 may comprise a pipe or other conduit supplied from a reservoir or source (not shown) with wetting material flowing therethrough by gravity or under pressure in the direction indicated by arrow 20 and emptying as at 21 into the second zone as shown in FIGS. 1 and 2 medially or, as shown in FIG. 3, from another point. Source of wetting material 20 may be a single pipe as shown in FIGS. 1 and 2 or pipes 37, 38 which may connect with sources of different ingredients or of different wetting materials or different types of wetting materials and may be regulated by individual valves 39, 40 and/or (FIG. 3) a single control valve 41.

Having thus described my invention, what I claim as new and desire to secure by Letters Patent is:

1. An apparatus for treating dry particle materials, which consists of a conduit having an end for supply of dry particle material thereto, means in said conduit for imparting velocity to said particles from that end of the conduit through the conduit and out of the opposite open end of the conduit, three zones formed in said conduit intermediate said ends thereof, the first zone, adjacent said supply end of the conduit having incorporated therein said velocity imparting means and being of given cross sectional value and volumetric capacity for passage of said materials therethrough and into the second zone, at a given velocity, the second zone being of cross sectional and volumetric capacity greater than that of the said first zone, for passage therethrough of said particles more slowly, and axially aligned with said first zone, means opening into the axial center of said second zone for wetting said particles in passage therethrough, the second zone portion of the apparatus opening into the third zone thereof, said third zone portion thereof being of lesser cross sectional value and volumetric capacity than the second zone, for passage of said particles through said third zone and out of said open end of the conduit at a more rapid rate.

2. In an apparatus as set forth in claim 1, said means for so wetting said particles in passing through said second zone being disposed in the second zone adjacent the first zone.

References Cited in the file of this patent
UNITED STATES PATENTS

| | | |
|---|---|---|
| 2,177,092 | Burke | Oct. 24, 1939 |
| 2,737,960 | Anderson | Mar. 13, 1956 |
| 2,918,263 | Eichhorn | Dec. 22, 1959 |